June 25, 1968

F. A. TEIGEN 3,389,731

APPARATUS FOR TOPPING ONIONS

Filed May 11, 1966

INVENTOR
FERDINAND AUSTIN TEIGEN

Braddock+Burd
ATTORNEYS

INVENTOR
FERDINAND AUSTIN TEIGEN

By Braddock + Burd
Attorneys

United States Patent Office 3,389,731
Patented June 25, 1968

3,389,731
APPARATUS FOR TOPPING ONIONS
Ferdinand Austin Teigen, Minneapolis, Minn., assignor to Dorothy Russell, Teigen, Minneapolis, Minn.
Filed May 11, 1966, Ser. No. 549,351
13 Claims. (Cl. 146—83)

ABSTRACT OF THE DISCLOSURE

A machine for topping onions having a first conveyor for moving onions into an erection chamber formed by a tunnel-like enclosure. A second conveyor having spaced transverse rod members moves adjacent the ceiling of the tunnel-like enclosure having an opening into an amputation chamber. The rods of the second conveyor are spaced apart to allow tops of the onions to pass through the second conveyor but prohibit the onion bulbs from passing through the second conveyor to the amputation chamber. Located within the amputation chamber is a rotary shear operative to amputate the onion tops which project through the spaces between the rods of the second conveyor. A suction fan withdraws air from the housing whereby air flows upwardly through the erection chamber to erect the onions and carry the onions upwardly into engagement with the second conveyor.

---

The present invention pertains in general to the preparation of onions for marketing and specifically to an apparatus for topping onions.

Onions are living entities subject to infections, resultant deterioration and destruction by pathogenic microorganisms. Lesions and wounds usually form ports of entry into succulent onion tissues for spores and bacterial which are principally causitive of infection and resultant damage of onions. It is a condition prerequisite to avoidance of infection and resultant deterioration that onions be handled and topped in a manner which minimizes wounds.

It is essential that onions be topped preparatory to marketing or storage. Topping of onions consists primarily of removing the tops attached to the onion bulbs. This is a surgical operation because the tissues are completely and permanently separated by amputation. The method of topping onions most generally used is the hand labor method which consists of men and women toppers holding the bulbs in one hand and cutting off the attached tops with scissors held in the other hand. Mechanical means for topping onions are largely limited to pinching the tops off the bulbs between pairs of rollers, or to blowing the tops upwardly from a screen and moving the onions into the operative path of a functioning sickle bar in an effort to cut off the tops. This cutting is not a shearing cut with the result that the remaining stem ends of the bulbs, if any, have shattered wounds and wide openings readily susceptible to ingress of pathogenic microorganisms. These mechanical means for topping onions are not designed to control the length of the attached tops or stems which remain on the bulbs. The wound on the stem ends of onions created by amputation of the tops is unavoidable but resultant infection may be inhibited by: (1) amputating the attached tops at a point substantially one inch and preferably one and one half inches but not more than three inches outwardly from the necks of the bulbs to inhibit resulant infection by depriving spores and bacteria of direct entry to succulent tissue of the neck and onion bulb; (2) severing the attached tops by a shearing force to cause protoplasmic fluids to form a seal barricading ingress of pathogenic microorganisms into wound caused by severance; and (3) gentle handling of bulbs during the topping operation to reduce shock, concussion, bruise and injury which predisposes the bulb to resultant infection or deterioration.

The apparatus of the present invention operates to top onions whereby resultant injury of and damage to residual bulbs are reduced only to lesions of amputation, hand labor is eliminated, costs are reduced to a minimum, and clean onions are available for marketing. The infection of the bulbs is inhibited by providing that the length of the attached tops or stems of the bulbs after topping have a length within a range of one to three inches. The lesions are substantially sealed by compressing the attached tops into serverance with shearing forces to cause the wound of amputation to be closed to the entry of pathogenic microorganisms.

Briefly described, the invention comprises an apparatus operable to amputate the tops from onion bulbs in a fast and efficient manner with a minimum of injury to the bulbs. The apparatus has a movable first conveyor for receiving the onions having bulbs and attached tops. The conveyor is operable to move the onions into the primary end of an erection chamber formed by a tunnel-like passageway. A movable second conveyor having apertures with dimensions to facilitate the passage of the tops and preclude the passage of the bulbs is located above the first conveyor and forms a movable ceiling. The portion of the second conveyor facing the first conveyor is enclosed in a housing having an opening. The lower portion of the second conveyor moves over the opening. The onions in the erection chamber are erected or turned upright by air moving upwardly through the erection chamber. Air is withdrawn from the housing by a suction means so that air flows from the erection chamber through the apertures and into the housing. The moving air carries the erected onions in engagement with the ceiling portion of second conveyor. The bulbs are barricaded against the ceiling thereby fixing the position of the bulbs relative to a cutting mechanism located in the housing. The tops being subjected to moving air are held outwardly of the erection chamber and are carried by the movable ceiling into the cutting mechanism operable to sever by a shearing operation the tops from the bulbs. The moving air draws the tops into the cutting mechanism with the ceiling holding the bulbs away from the cutting mechanism whereby the tops are amputated by shearing force at points one to three inches from the necks of the onions. The severed tops are carried by the moving air to a disposal location and the bulbs are discharged to a separate receiving area.

In the drawings:

FIGURE 3 is a sectional view taken along the line 3—3 of FIGURE 1 showing the cutting mechanism of the onion topping machine.

Figure 1:
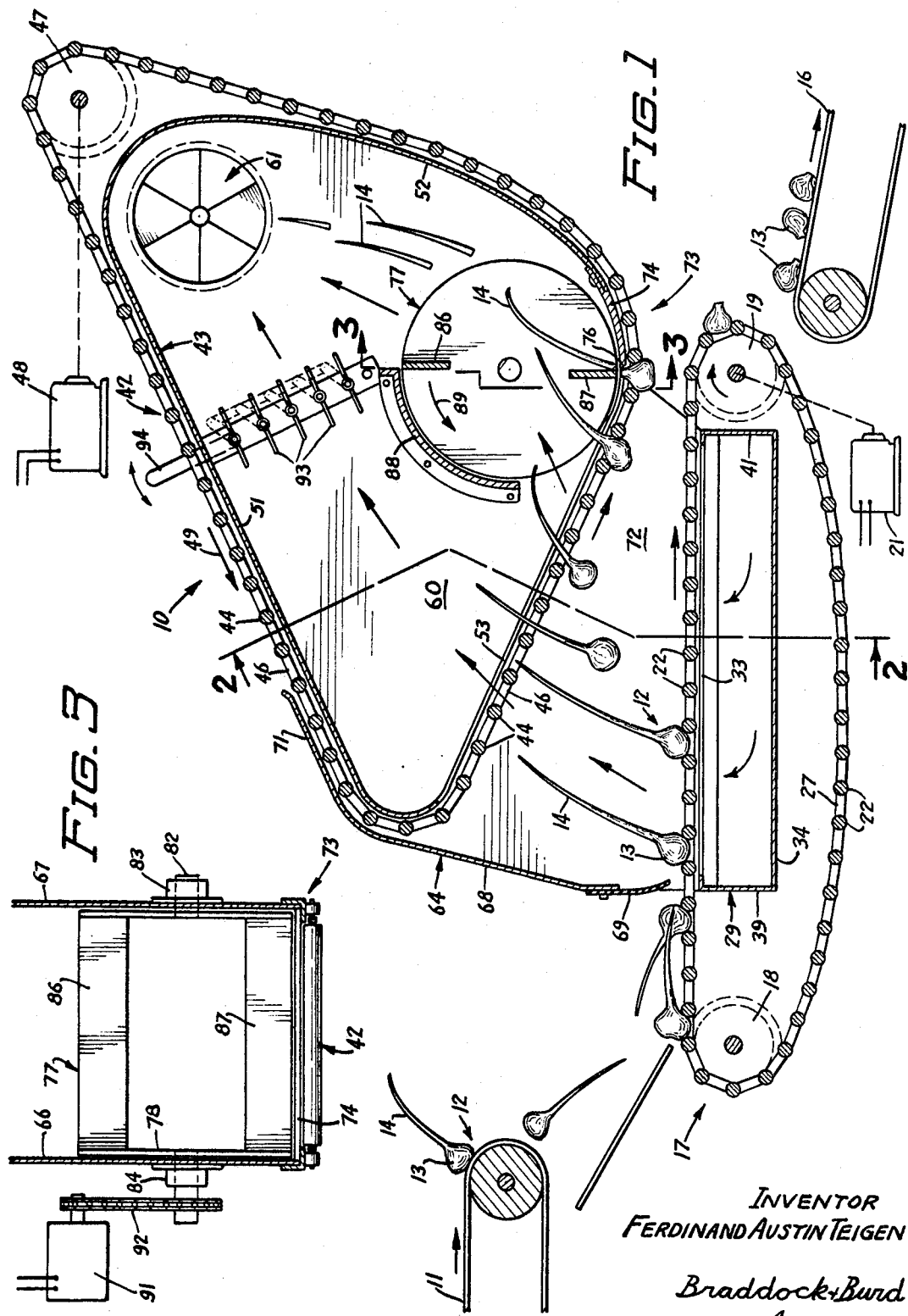
FIGURE 1 is a schematic longitudinal view partly in section of an onion topping machine for performing the method of topping onions of this invention.

Referring to FIGURE 1 of the drawings there is shown a machine indicated generally at 10 for topping onions. Machine 10 is operable to cut the tops from the bulbs in a fast and effective manner with a minimum of injury to the outer protective skins of the onion bulb. The onions indicated generally at 12 may be new onions discharged from an onion digging machine or onions which have been in storage. Onions 12 have bulbs 13 and elongated tops 14 which must be amputated from the bulbs before the onions are in marketable condition.

A delivery conveyor 11 is used to transport onions to the receiving end of machine 10. Conveyor 11 is operable to deliver onions from an onion digging unit or carry onions from a storage bin. Machine 10 receives a continuous supply of onions from conveyor 11 and automatically and continuously amputates the tops 14 from the bulbs 13. After the tops are severed from the bulbs, the bulbs are discharged onto a receiving conveyor 16 used to transport the onion bulbs to a storage or bagging location.

Machine 10 has a bottom conveyor indicated generally at 17 used to receive the onions, to move the onions in an elongated path and to discharge the onion bulbs onto receiving conveyor 16. Conveyor 17 is trained about transverse sprockets 18 and 19 with sprocket 19 being driven by a motor 21. Conveyor 17 comprises a plurality of side-by-side transverse tubular rollers 22. Adjacent rollers 22 are spaced from each other a distance to prevent onions from falling through the top run of the conveyor. For example, each roller 22 may be a tubular member having an outside diameter of 1¼ inches and the space between adjacent rollers being 1¼ inches.

Figure 2:
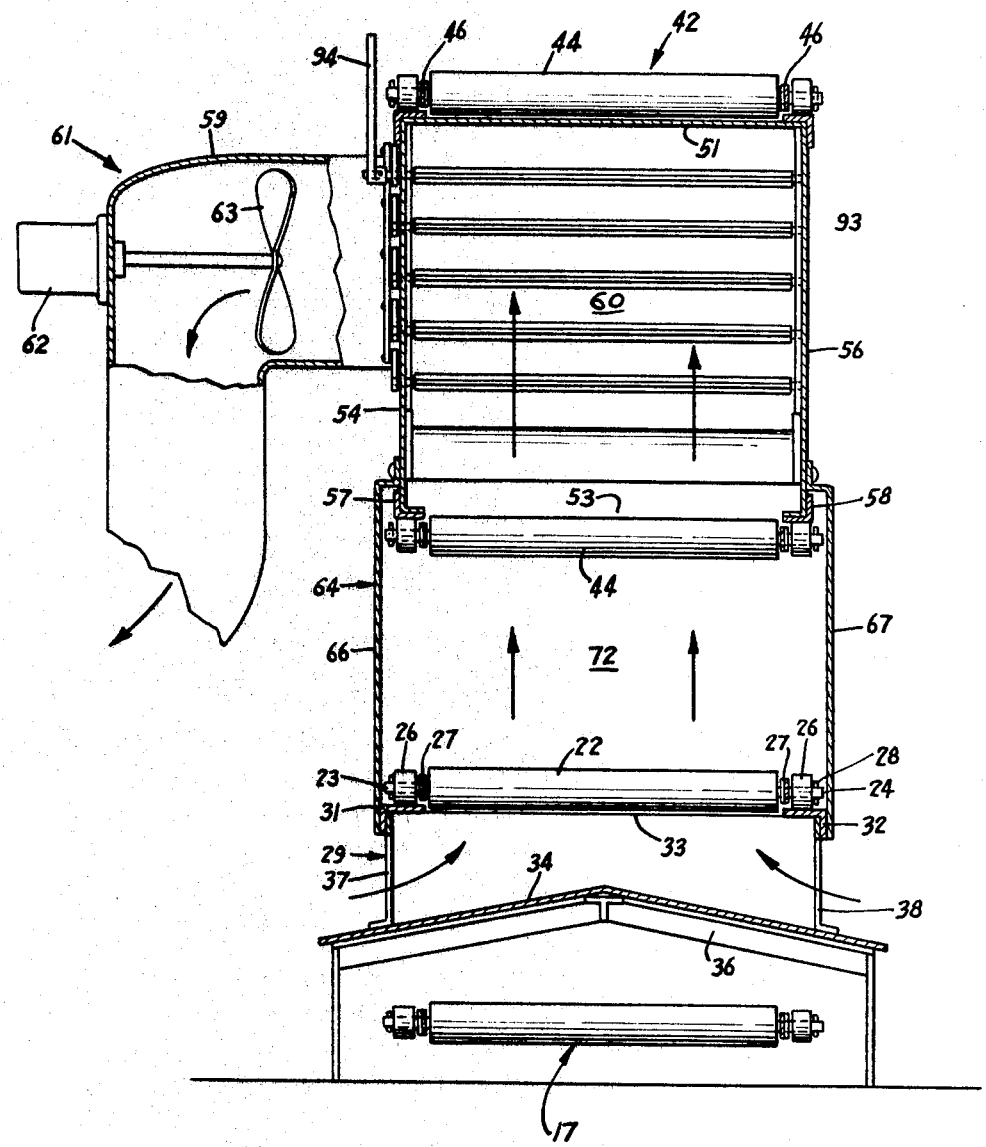
FIGURE 2 is a sectional view taken along the line 2—2 of FIGURE 1.

As shown in FIGURE 2, each roller 22 has axial projections 23 and 24 at the opposite ends carrying rollers 26. Links 27 connect the opposite ends of adjacent rollers to form an endless conveyor. Retaining means 28, as cotter pins or split rings, on the outer ends of projections 23 and 24 hold the rollers 26 and links 27 in assembled relation with projections 23 and 24.

Located between conveyor sprockets 18 and 19 and below the upper run of conveyor 17 is a support indicated generally at 29. Support 29 is a box-like structure having a pair of laterally spaced horizontal top rails 31 and 32 defining a generally rectangular shaped opening 33. Rails 31 and 32 provide tracks for the end rollers 26 mounted on each of tubular rollers 22 whereby on operation of conveyor 17 the tubular rollers 22 move across opening 33. Positioned below opening 33 is a bottom wall 34 supported on a frame 36. Support 29 has open opposite sides 37 and 38 and closed ends 39 and 41 to allow free movement of air upwardly through opening 33 and the top run of conveyor 17.

As shown in FIGURE 1, a top conveyor indicated generally at 42 located above bottom conveyor 17 extends about a housing indicated generally at 43. Top conveyor 42 has a plurality of side-by-side transverse members 44, as tubular rollers, which are connected to each other by links 46. Rollers 44 and links 46 are identical in construction with rollers 22 and links 27 of bottom conveyor 17. The top portion of conveyor 42 is trained about drive sprockets 47 drivably connected to a motor 48. On operation of motor 48, conveyor 42 is moved around housing 43 in the direction of arrow 49.

Housing 43 has an upwardly and rearwardly extended top wall 51 joined to a downwardly curved back wall 52. The bottom of housing 43 has a rectangular opening 53. Housing 43 is completed with spaced upright side walls 54 and 56 secured to the sides of the top and back walls and defines an amputation chamber 60. Extended along the sides of opening 53 are downwardly and rearwardly inclined rails 57 and 58 which guide the lower run of conveyor 42 in a downward direction toward the rear of the machine. The lower run of conveyor 42 covers opening 53 and comprises the movable floor of amputation chamber 60. The inclination of the lower run of the top conveyor makes the facing runs of the top and bottom conveyors converge toward each other in the direction of movement of the respective runs of the conveyors. The vertical distance between the forward facing portions of conveyors 17 and 24 may range between 15 and 24 inches while the rear adjacent portions of the conveyors may be as close as three to five inches.

The top portion of side wall 54 has a discharge opening leading to a discharge pipe 59 used to direct cut tops and other material from the machine. A suction means indicated generally at 61 operable to withdraw air from housing 43 is located in discharge pipe 59. Suction means 61 is illustrated as a motor 62 driving a fan 63. It is to be understood that any suitable structure for withdrawing air from housing 43 may be employed. Suction means 61 has the capacity to move air through erection chamber 72 at a velocity up to 600 feet per second.

An enclosure indicated generally at 64 defines an erection chamber 72 in the space between bottom conveyor 17 and top conveyor 42. Erection chamber 72 is a longitudinal passageway or tunnel-like enclosure having a movable floor comprising the upper run of bottom conveyor 17 and a movable ceiling comprising the inclined lower run of top conveyor 42. Conveyors 17 and 42 are driven at substantially the same rate of speed whereby the floor and ceiling move together toward the discharge end of the machine. As shown in FIGURE 2, enclosure 64 has upright side walls 66 and 67 attached to support 29 and housing side walls 54 and 56. The forward edges of side walls 66 and 67 are secured to an upright transverse front wall 68. The lower edge of front wall 68 located above conveyor 17 provides an entrance opening into erection chamber 72. The entrance opening is partially closed with a flexible shield 69 secured to and projected downwardly from front wall 68 to maintain the size of the inlet opening at a minimum thereby reducing the amount of air flowing through the inlet opening. The top of front wall 68 has an upwardly and rearwardly inclined extension 71 located over top conveyor 42 forming with the top wall 51 a guide channel for the forward portion of conveyor 42.

As onions 12 move in an elongated path longitudinally through erection chamber 72, a cutting mechanism indicated generally at 73 located within housing 43 amputates the onion tops 14 from the onion bulbs 13. Cutting mechanism 73 has a stationary transversely extended blade 74 secured to the bottom portion of back wall 52. Blade 74 has a forward transverse knife edge 76 forming the rear end of opening 53. Rotatably mounted above blade 74 is a rotor or cutter indicated generally at 77 which cooperates with knife edge 76 to sever the tops from the bulbs.

As shown in FIGURE 3, rotor 77 comprises a pair of axially spaced upright end discs 78 and 79 having axially outwardly projected stub shafts 81 and 82. The bearings 83 and 84 secured to housing side walls 66 and 67 receive stub shafts 81 and 82 to rotatably mount the rotor on housing 43. Extended transversely between discs 78 and 79 are a pair of diametrically opposed blades 86 and 87. Opposite ends of the blades are secured to discs 78 and 79 respectively. Blades 86 and 87 are located in generally radial planes with their outer transverse edges in alignment with the peripheral surfaces of the discs 78 and 79. As shown in FIGURE 1, the axis of rotation of rotor 77 is substantially parallel to and in the upright plane of the transverse knife edge 76. Knife edge 76 is located closely adjacent the outer edges of the blades as they move past the edge as shown in FIGURES 1 and 3. As the blades 86 and 87 move past knife edge 76 onion tops 14 are compressed into severance with shearing forces causing wounds of amputation to be sealed against entry of pathogenic microorganisms and other foreign elements.

To provide for increase flow of air through the rotor 77, the upper forward quarter of the rotor is covered by an arcuate cap 88 extended between and secured to side walls 54 and 56. Inner surface of cap 88 is located closely adjacent the outer periphery of the discs 78 and 79 so that the forwardly moving blade, as shown in FIGURE 1, has minimum interference with air flowing through housing 43.

As shown in FIGURES 1 and 3, rotor 77 is driven in the direction of arrow 89 by a motor 91 connected to shaft 81 by power transmitting means 92, as sprockets and an endless roller chain.

The flow of air moving through housing 43 above cap 88 is controlled by a plurality of transversely extended louvres 93 connected to an angularly movable control handle 94. Louvres 93 function as dampers which may be opened and closed to vary the flow of air through the rotor 77 as required to direct the onions and draw the tops of the onions through the spaces between adjacent rollers 44 of top conveyor 42.

Motors 21, 48, 62 and 91 may be separate electric motors, separate fluid motors operable by fluid under pressure by a common source or they may be replaced with suitable mechanical drive means operable by an internal combustion engine.

In use, onions are delivered by conveyor 11 to the forward end of the bottom conveyor 17 continuously and in random arrangement. Operation of conveyor 17 by motor 21 moves the onions in an elongated path under flexible shield 69 into erection chamber 72. The onions continuously enter the erection chamber 72 and are carried upwardly by moving air under sub-atmospheric pressure. As shown by the arrows in FIGURE 2, air pulled by suction means 61 moves through side openings 37 and 38 in support 29 up through opening 33 and top run of conveyor 17 and into erection chamber 72. As the air flows through erection chamber 72 the onions 12 are turned upright by the moving air with the tops projected in an upward direction. The forward portion of the erection chamber has sufficient height to permit the onion tops to extend in an upward direction. The air moves from erection chamber 72 through the bottom run of top conveyor 42 and the opening 53 in the housing 43 upwardly through the housing 43 and out through the discharge pipe 59. As the air moves through the bottom run of top conveyor 42, the onions follow the moving air upwardly until the onion bulbs engage adjacent rollers 44. The bulbs lodge between adjacent rollers and are held in engagement with the rollers by the moving air. Rollers 44 prevent the bulbs from moving upwardly in housing 43. As the bulbs fill the openings between adjacent rollers they restrict the amount of air flowing through the bottom run of conveyor 42 thereby increasing the velocity of the air flowing through the conveyor 42 with the result that the onions are firmly held in engagement with the rollers 44 extended over the opening 53 of housing 43. Motor 48 drives conveyor 42 moving the onions downwardly and rearwardly towards knife edge 76. When the onions reach knife edge 76 rotating blades 86 and 87 amputate the onion tops 14 from the bulbs 13. The severed tops are moved upwardly by the moving blades 86 and 87 and flow with the air stream through the discharge pipe 59.

The bulbs 13 move under the knife blade 74 and drop from conveyor 42 since the air is no longer moving through the section of the conveyor rearwardly of blade 74 and the back surface of knife blade 74 forces the bulb away from the conveyor rollers 46. The bulbs are discharged to the receiving conveyor 16 and carried thereby to a storage location.

In terms of a method of topping onions having bulbs and tops, the onions are initially delivered to the forward end of an elongated path on operation of conveyor 11. As the onions are received in the elongated path they are moved along the elongated path initially by the bottom conveyor 17 into erecting chamber 72. When the onions are in erecting chamber 72 they are erected or turned to an upright position and raised by air flowing under sub-atmospheric pressure upwardly through said elongated path. The erected onions are carried upwardly with the moving air into engagement with the ceiling of the erection chamber formed by the bottom run of top conveyor 42. The rollers 44 of conveyor 42 hold the onion bulbs in the chamber with the onion tops projected upwardly between adjacent rollers into amputation chamber 60. As the onions are held on the ceiling of the erection chamber they are moved by conveyor 42 toward cutting mechanism 73. The tops of the onions are amputated from the bulbs by operation of the cutting mechanism 73 located in the air stream flowing under sub-atmospheric pressure through housing 43. The cutting mechanism operates with shearing force to sever the tops from the bulbs. The shearing forces also compress the lesion on the onion stem whereby onion fluids seal the lesions. The free tops are discharged into the air flowing through housing 43 and carried to a disposal location. After the tops have been amputated from the bulbs, the bulbs are discharged from the elongated path onto a bulb receiving area.

The above description is the preferred method for topping onions. It is understood that various changes may be made in the form, details, and arrangements of the method without departing from the scope of the invention.

The embodiments of the invention in which an exclusive property or privilege is claimed are defined as follows:

1. An apparatus for topping onions comprising a first conveyor for receiving onions, a second conveyor located above said first conveyor, means for moving said first conveyor and second conveyor whereby the portions of each conveyor facing each other move in the same general directions, said second conveyor having a plurality of apertures with dimensions allowing the tops of onions to pass through the second conveyor and prohibiting the onion bulbs from passing through said second conveyor, housing means enclosing the portion of the second conveyor facing the first conveyor, said housing means having an opening over which said second conveyor moves with the apertures in communication with the opening, means for withdrawing air from said housing whereby air moves through the apertures in said second conveyor over said opening in the housing, said moving air erecting the onions and drawing the tops of the onions through the apertures in the second conveyor and cutting means located in the housing operable to cut the tops of onions projected through said second conveyor.

2. The apparatus defined in claim 1 wherein said first conveyor has spaced members allowing air to flow through said first conveyor to the space between the first and second conveyors where the onions are erected.

3. The apparatus defined in claim 1 wherein the first conveyor and the second conveyor are angularly disposed relative to each other.

4. The apparatus defined in claim 1 further characterized by enclosure means defining an erection chamber below the opening in said housing, the upper portion of the first conveyor providing a movable floor for said chamber and the lower portion of the second conveyor providing a movable ceiling for said chamber whereby air flows through said lower and upper portions into said housing.

5. The apparatus of claim 1 wherein said first conveyor and said second conveyor each have spaced transverse members with the distance between adjacent members of said second conveyor allowing the tops of onions to project into the housing and prohibiting the onion bulbs from passing through said second conveyor.

6. The apparatus of claim 1 wherein said cutting means includes a stationary blade having a transverse cutting edge at the rear section of the opening in said housing, a rotor having transverse blade means rotatable about an axis generally parallel to said transverse cutting edge whereby the transverse blade means moves over the stationary blade amputating the tops from the bulbs by shearing action.

7. The apparatus of claim 6 further characterized with stationary cover means enclosing the upper and forward portion of said rotor to increase the flow of air through said rotor.

8. The apparatus of claim 6 wherein the axis of rotation of the rotor is in the upright plane of the cutting edge of the stationary blade.

9. The apparatus of claim 1 further characterized with adjustable means to regulate the rate of flow of air through said housing and through said cutting means.

10. An apparatus for topping onions comprising: a support having an opening in communication with the atmosphere, means for receiving onions and moving said onions in an elongated path over said opening, a movable conveyor located above said means in the direction of the elongated path, a portion of said conveyor facing said means, wall means enclosing the space between said means and movable conveyor defining an erection chamber, said movable conveyor having a plurality of apertures with dimensions allowing the tops of onions to pass through the conveyor and prohibiting the onion bulbs from passing through said conveyor, housing means having an opening in communication with the top of the erection chamber over which said conveyor moves with the apertures in communication with the opening, means for moving air upwardly through said erection chamber and through said apertures in said conveyor, the air moving in said erection chamber erecting the onions and carrying the tops through the apertures in the conveyor, said bulbs being held against the conveyor by the moving air, and cutting means located above said conveyor adjacent the rear portion of the opening in the housing means for severing the tops projected through the conveyor from the bulbs.

11. The apparatus defined in claim 10 wherein the bottom portion of the conveyor is inclined downwardly and rearwardly with respect to the means for receiving and moving the onions whereby the erection chamber is a converging tunnel-like passageway.

12. The apparatus of claim 10 wherein said cutting means includes a stationary transverse blade located adjacent the top of the portion of the conveyor holding the bulbs and movable transverse blade means coacting with the stationary transverse blade to amputate the tops from the bulbs by shearing action.

13 An apparatus for topping onions comprising: a tunnel-like enclosure defining an onion erection chamber, said enclosure having a first opening along the bottom thereof in communication with the atmosphere and a second opening along the top thereof, a first conveyor including perforated endless means movable to convey onions into said erection chamber along the bottom thereof over said first opening, a second conveyor including perforated endless means having apertures with dimensions allowing the tops of the onions to pass through the second conveyor and prohibiting the onion bulbs from passing through said second conveyor, said second conveyor having a portion movable along the top of the enclosure over the second opening to form a movable ceiling of the erection chamber, housing means covering said second opening and forming an amputation chamber, rotary shears located in said amputation chamber above said movable portion of the second conveyor operative to draw onions into engagement with the said second conveyor and amputate the tops of the onions by shearing stress, drive means to operate said conveyors and rotary shears, means for withdrawing the air from said housing whereby air moves upwardly through the first opening, the erection chamber, and the second opening, said moving air erects the onions and draws the tops of the onions through the apertures in the second conveyor, said second conveyor moving the tops of the erected onions into the rotary shears whereby the tops of the onions projected through the second conveyor are amputated, and means to deliver the onion bulbs after being topped to a desired receiver.

References Cited
UNITED STATES PATENTS

| | | | |
|---|---|---|---|
| 926,286 | 6/1909 | Petrie | 146—83 |
| 1,299,233 | 4/1919 | Royer | 146—83 |
| 2,553,519 | 5/1951 | Lenz | 146—83 X |
| 2,750,977 | 6/1956 | Vella et al. | 146—83 |
| 3,163,234 | 12/1964 | Boyer | 171—17 |
| 3,285,306 | 11/1966 | Wetzel | 146—83 |

W. GRAYDON ABERCROMBIE, *Primary Examiner.*